US010819262B2

(12) United States Patent
Gu et al.

(10) Patent No.: US 10,819,262 B2
(45) Date of Patent: Oct. 27, 2020

(54) POWER GENERATION SYSTEM, SYSTEM FOR SUPPRESSING SUB-SYNCHRONOUS OSCILLATION AND METHOD FOR CONTROLLING OPERATION OF POWER SYSTEM

(71) Applicant: General Electric Company, Schenectady, NY (US)

(72) Inventors: Yunjie Gu, Shanghai (CN); Yuxiang Wang, Shanghai (CN); Jiao Liu, Shanghai (CN); Zhuohui Tan, Shanghai (CN); David Smith, Salem, VA (US); Wei Ren, Schenectady, NY (US); Wuhua Li, Shnaghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/126,110

(22) Filed: Sep. 10, 2018

(65) Prior Publication Data

US 2019/0089279 A1 Mar. 21, 2019

(30) Foreign Application Priority Data

Sep. 21, 2017 (CN) .......................... 2017 1 0858081

(51) Int. Cl.
*H02P 9/10* (2006.01)
*H02J 3/24* (2006.01)
(Continued)

(52) U.S. Cl.
CPC ................ *H02P 9/10* (2013.01); *F03D 9/255* (2017.02); *H02J 3/24* (2013.01); *H02P 9/007* (2013.01);
(Continued)

(58) Field of Classification Search
CPC F03D 9/255; F05B 2220/70646; H02J 3/386; H02J 3/24; H02P 9/007; H02P 9/02; H02P 9/10; H02P 9/105; H02P 2101/15
See application file for complete search history.

(56) References Cited

U.S. PATENT DOCUMENTS 8,258,642 B2 * 9/2012 Koerber ................ F03D 7/0284
290/44
8,310,074 B2 * 11/2012 Larsen .................... H02P 9/007
290/44

(Continued)

FOREIGN PATENT DOCUMENTS

CN 101615791 B 8/2011
CN 103475011 A 12/2013
(Continued)

OTHER PUBLICATIONS

Leon, A.E, and Solsana, J.A., "Sub-Synchronous Interaction Damping Control for DFIG Wind Turbines", IEEE Transactions on Power Systems, vol. 30, Issue.1, pp. 419-428 (Jan. 2015).
(Continued)

*Primary Examiner* — Tulsidas C Patel
*Assistant Examiner* — S. Mikailoff
(74) *Attorney, Agent, or Firm* — Dority & Manning, P.A.

(57) ABSTRACT

The present invention discloses a power generation system including a double-fed induction generator, a power converter, and a controller. The double-fed induction generator includes a rotor and a stator coupled to a grid. The power converter includes a rotor side converter coupled to the rotor of the generator, a grid side converter coupled to the grid, and a DC bus coupled between the rotor side converter and the grid side converter. The controller includes a rotor side controller for controlling the rotor side converter and a grid side controller for controlling the grid side converter. The rotor side controller includes a compensator having a trans-
(Continued)

fer function and configured to counter a negative resistance effect of the generator to suppress sub-synchronous oscillations. The present invention further discloses a system for suppressing sub-synchronous oscillations and a method for controlling operation of a power system.

17 Claims, 13 Drawing Sheets

(51) Int. Cl.
| | |
|---|---|
| *H02P 9/00* | (2006.01) |
| *F03D 9/25* | (2016.01) |
| *H02P 9/02* | (2006.01) |
| *H02P 101/15* | (2016.01) |
| *H02J 3/38* | (2006.01) |

(52) U.S. Cl.
CPC ............... *H02P 9/02* (2013.01); *H02P 9/105* (2013.01); *F05B 2220/70646* (2013.01); *H02J 3/386* (2013.01); *H02P 2101/15* (2015.01)

(56) References Cited

U.S. PATENT DOCUMENTS

| | | | | |
|---|---|---|---|---|
| 9,455,633 | B2* | 9/2016 | Olea | H02M 3/335 |
| 9,548,690 | B2* | 1/2017 | Ren | H02P 9/007 |
| 9,728,969 | B2* | 8/2017 | Tarnowski | F03D 7/0272 |
| 2011/0101689 | A1* | 5/2011 | Larsen | H02P 9/007 |
| | | | | 290/44 |
| 2012/0299305 | A1* | 11/2012 | Brogan | H02J 3/386 |
| | | | | 290/55 |
| 2013/0009610 | A1 | 1/2013 | Niiranen et al. | |
| 2013/0027994 | A1* | 1/2013 | Nelson | H02P 9/105 |
| | | | | 363/40 |
| 2013/0176751 | A1* | 7/2013 | Olea | H02M 3/335 |
| | | | | 363/16 |
| 2015/0249413 | A1* | 9/2015 | Ren | H02P 9/007 |
| | | | | 290/44 |
| 2017/0353036 | A1* | 12/2017 | Gil Lizarbe | H02J 3/386 |
| 2018/0159453 | A1* | 6/2018 | Andersen | H02P 9/007 |
| 2018/0328342 | A1* | 11/2018 | Ren | F03D 7/0272 |

FOREIGN PATENT DOCUMENTS

| | | |
|---|---|---|
| CN | 102684209 B | 9/2014 |
| CN | 102769296 B | 2/2015 |
| CN | 105024388 A | 11/2015 |
| CN | 105048482 A | 11/2015 |
| CN | 105633981 A | 6/2016 |
| EP | 3 073 631 A1 | 9/2016 |
| WO | 2016/119585 A1 | 8/2016 |

OTHER PUBLICATIONS

Leon, A.E., et al., "Subsynchronous resonance mitigation using variablespeed wind energy conversion systems", IET Generation, Transmition and Distribution, vol. 7, Issue.5, pp. 511-525 (May 2013).

Extended European Search Report and Opinion issued in connection with corresponding EP Application No. 18195809.1 dated Jan. 16, 2019.

Zhao et al., "An Optimal Reactive Power Control Strategy for a DFIG-based Wind Farm to Damp and the Sub-Synchronous Oscillation of a Power System", Energies, vol. 7, pp. 3086-3103, May 5, 2014.

Graf, Rudolf F., Modern Dictionary of Electronics, Seventh Edition, 1999, p. 499.

* cited by examiner

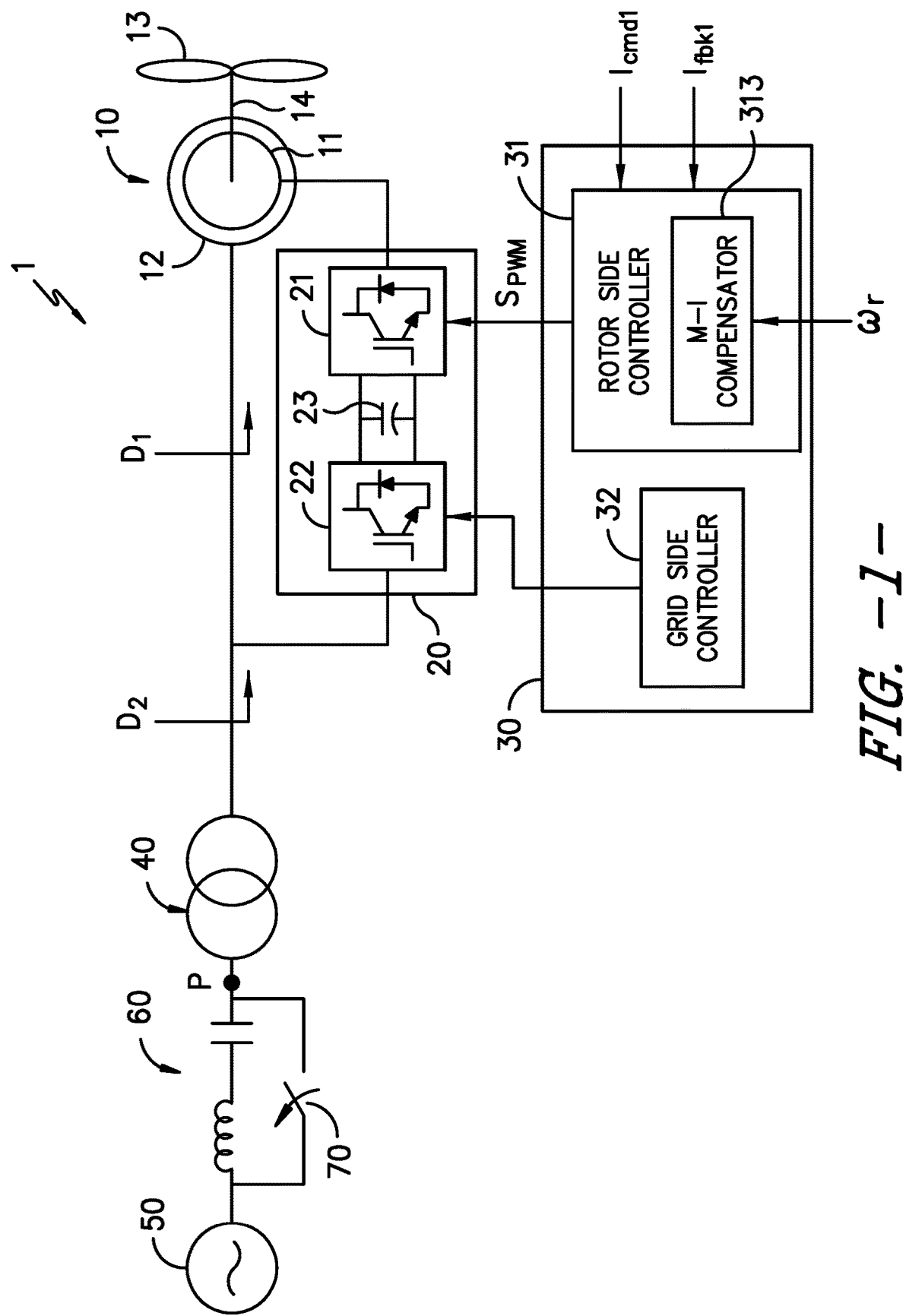
FIG. -1-

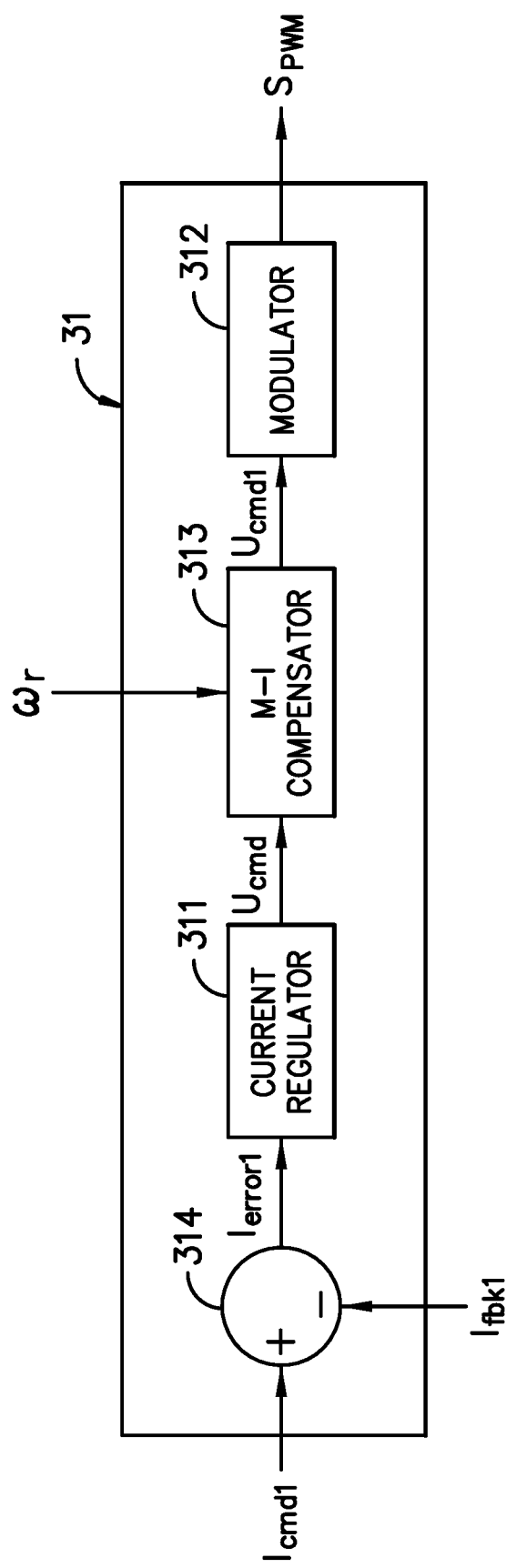
FIG. -2-

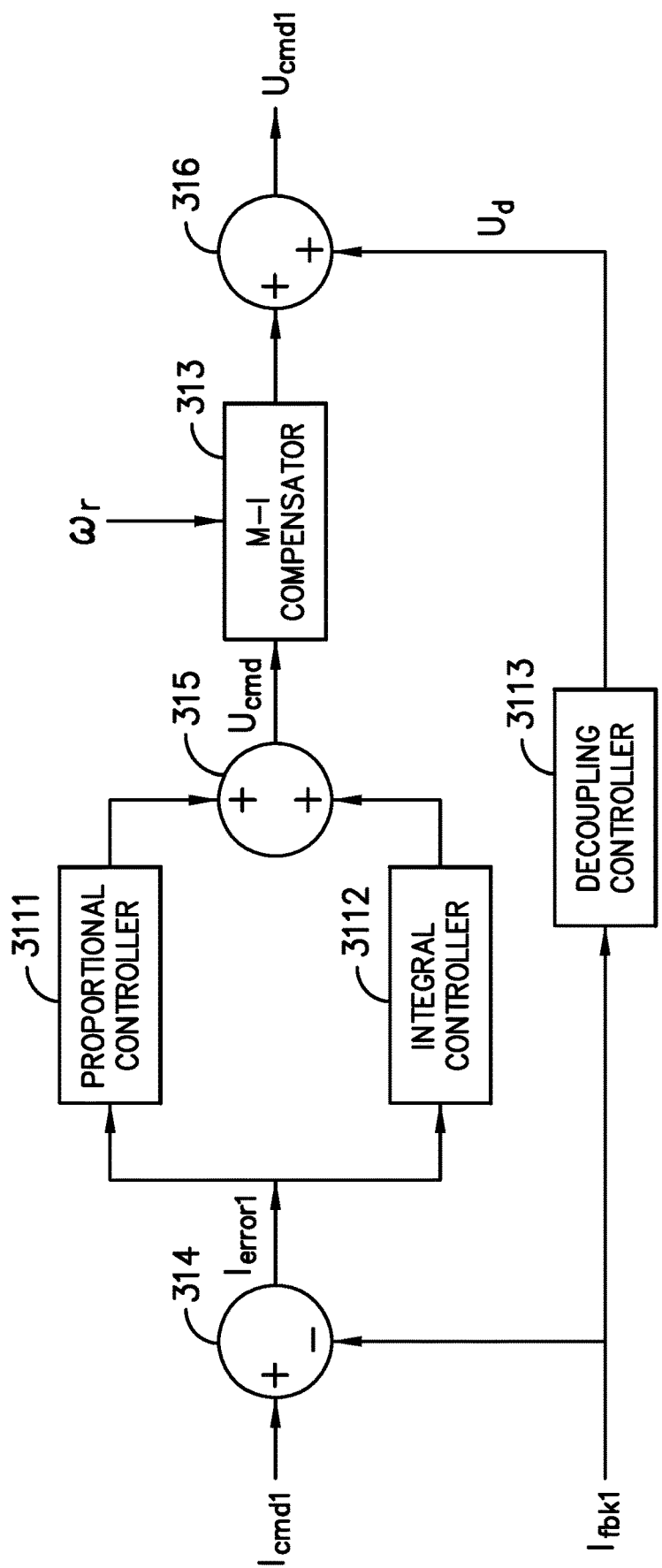
FIG. -3-

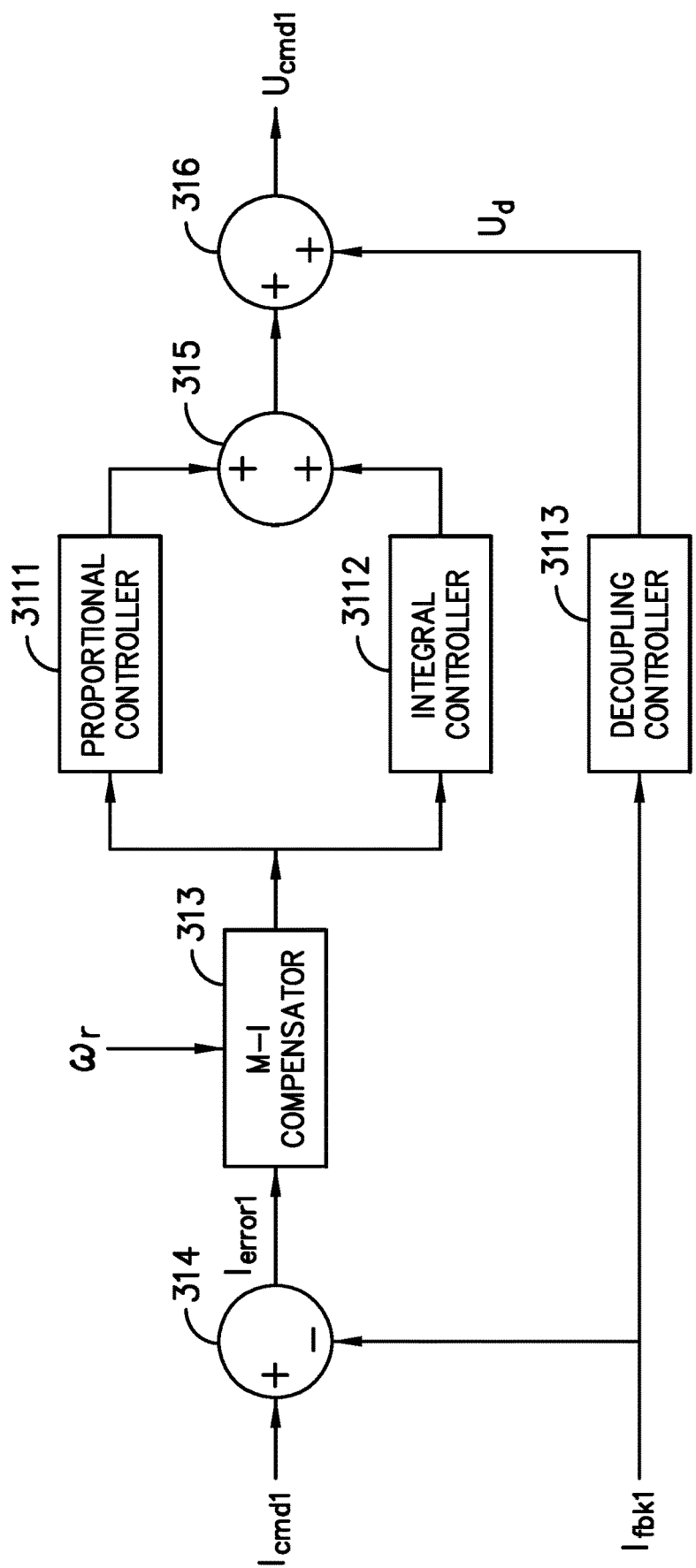
FIG. -4-

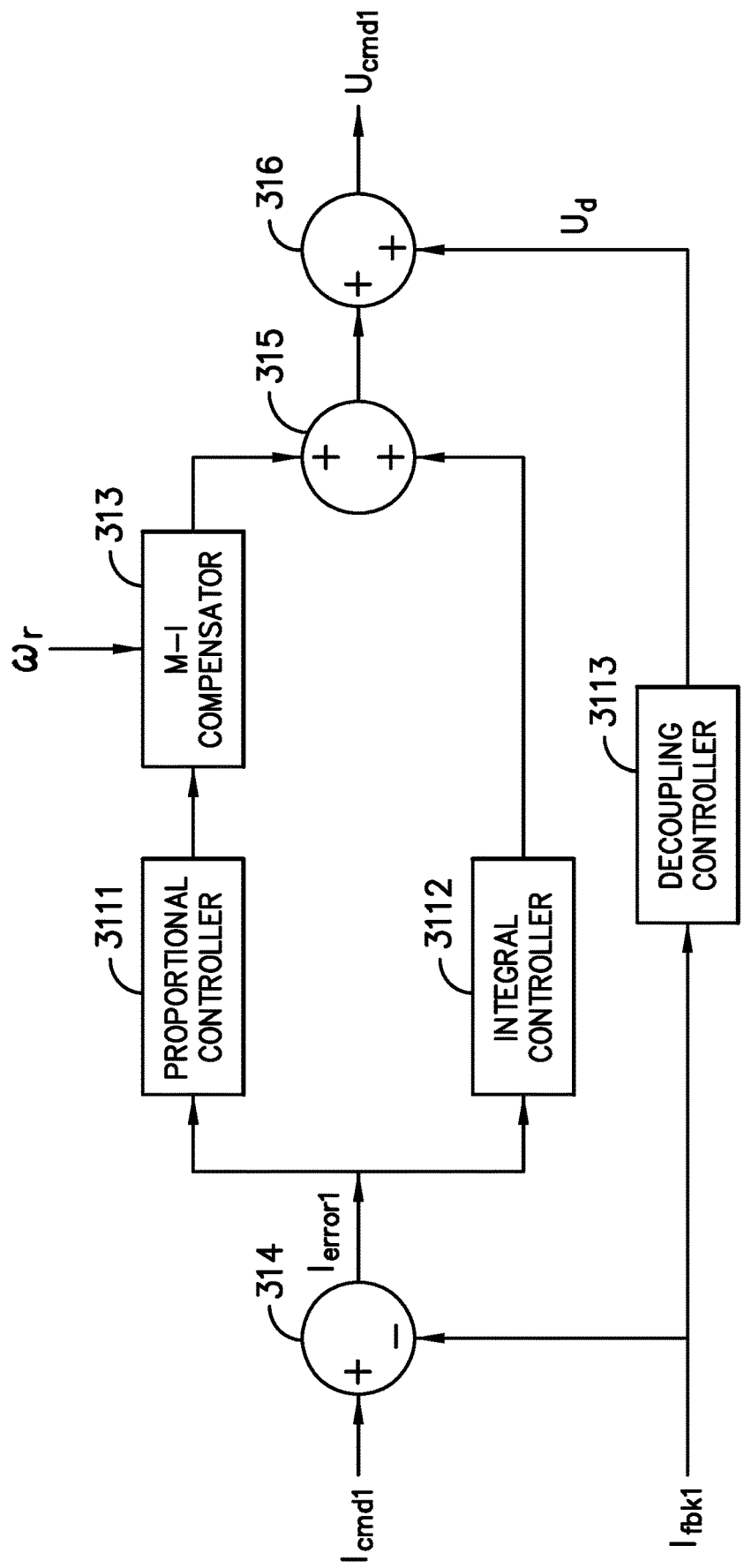
FIG. -5-

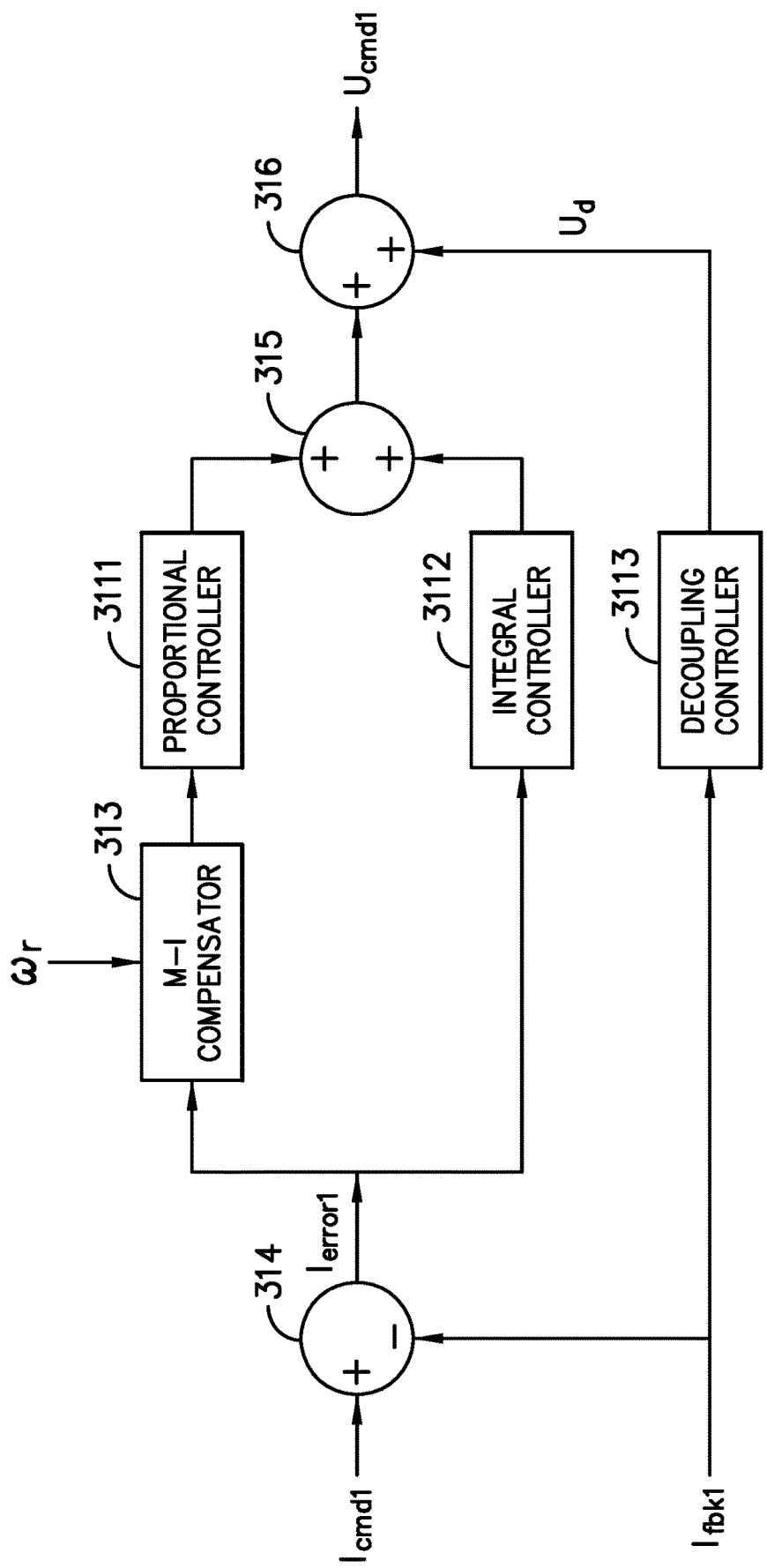
FIG. -6-

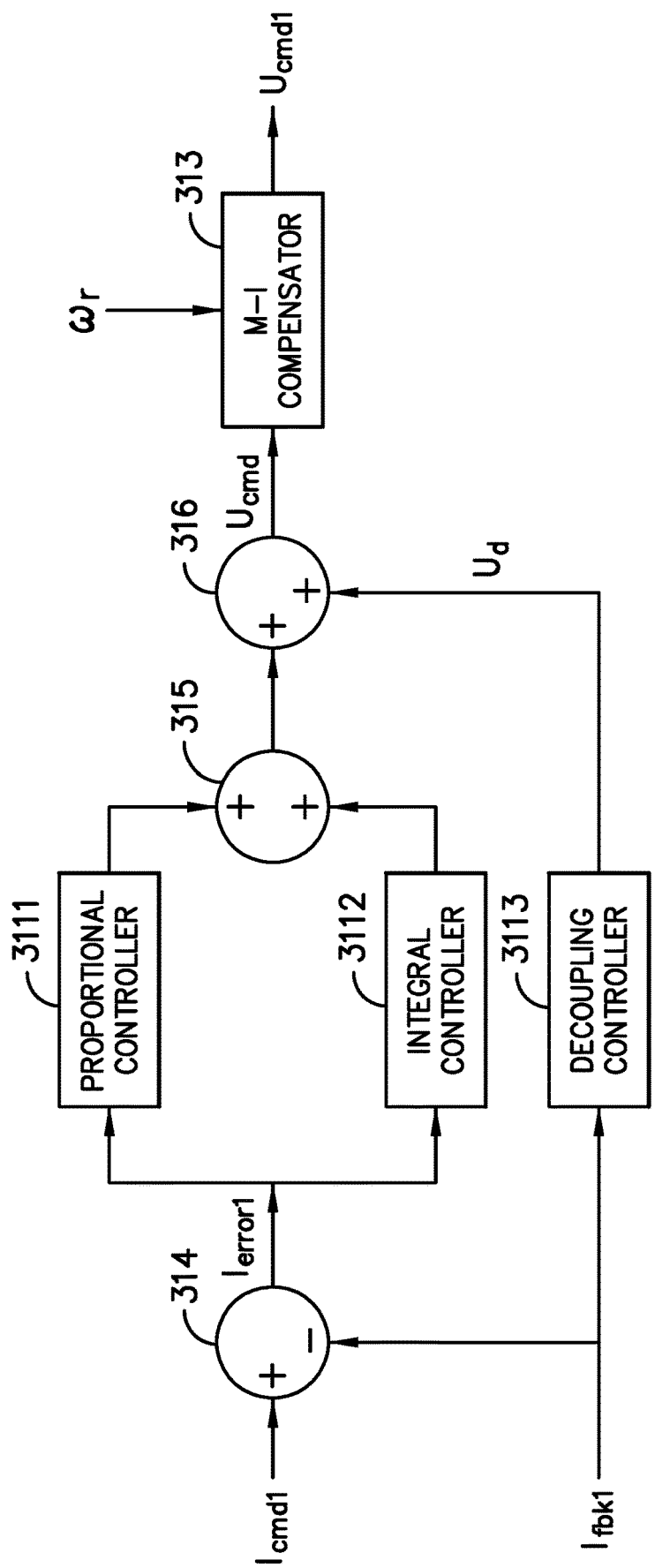
FIG. -7-

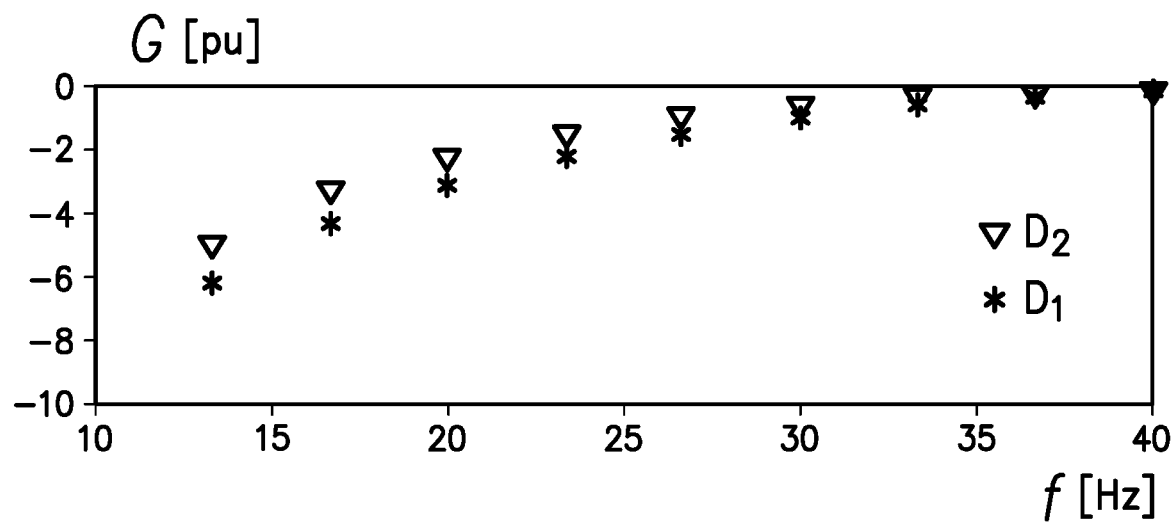
FIG. -8-
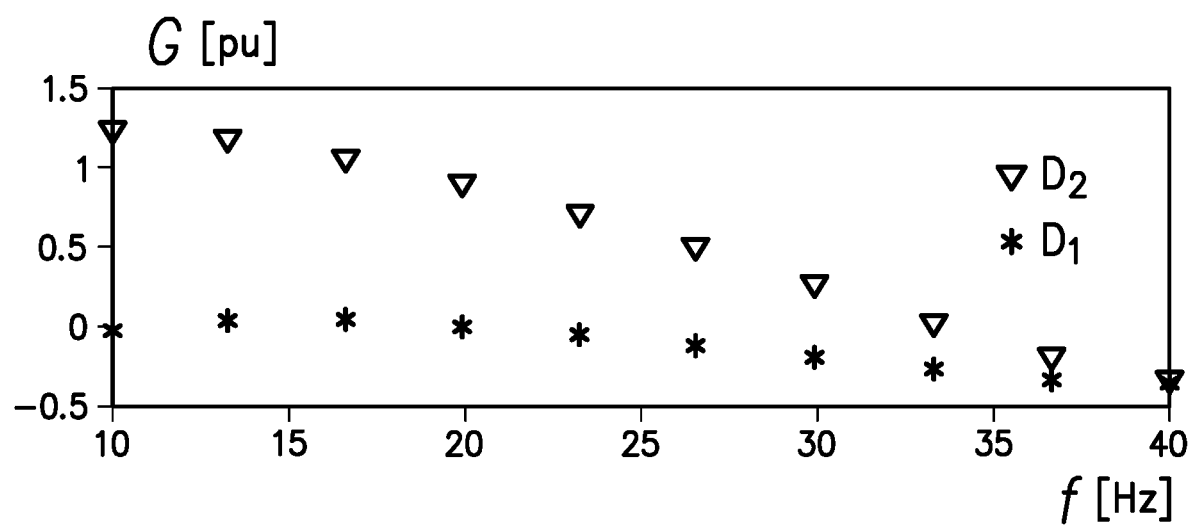
FIG. -9-

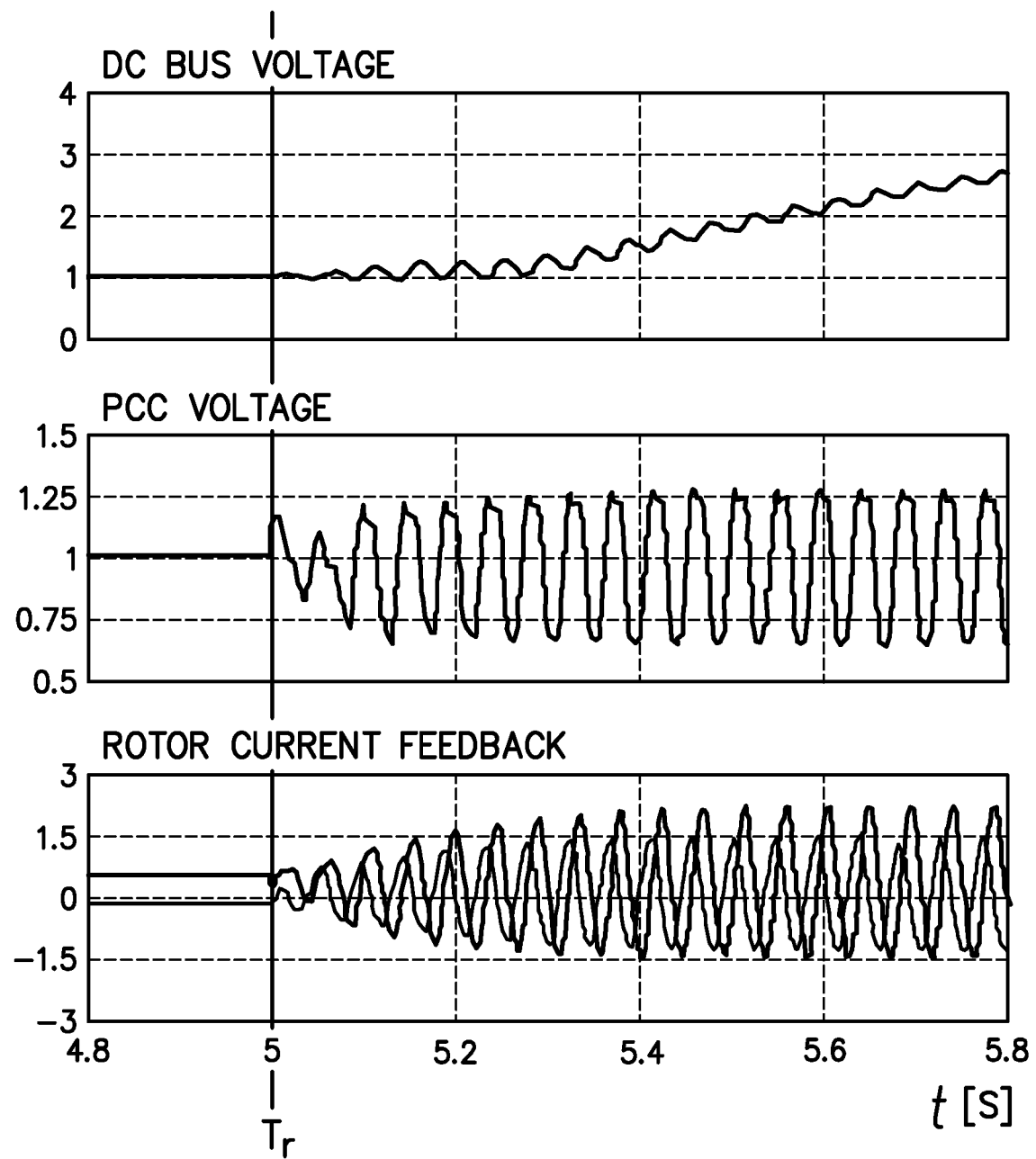
FIG. -10-

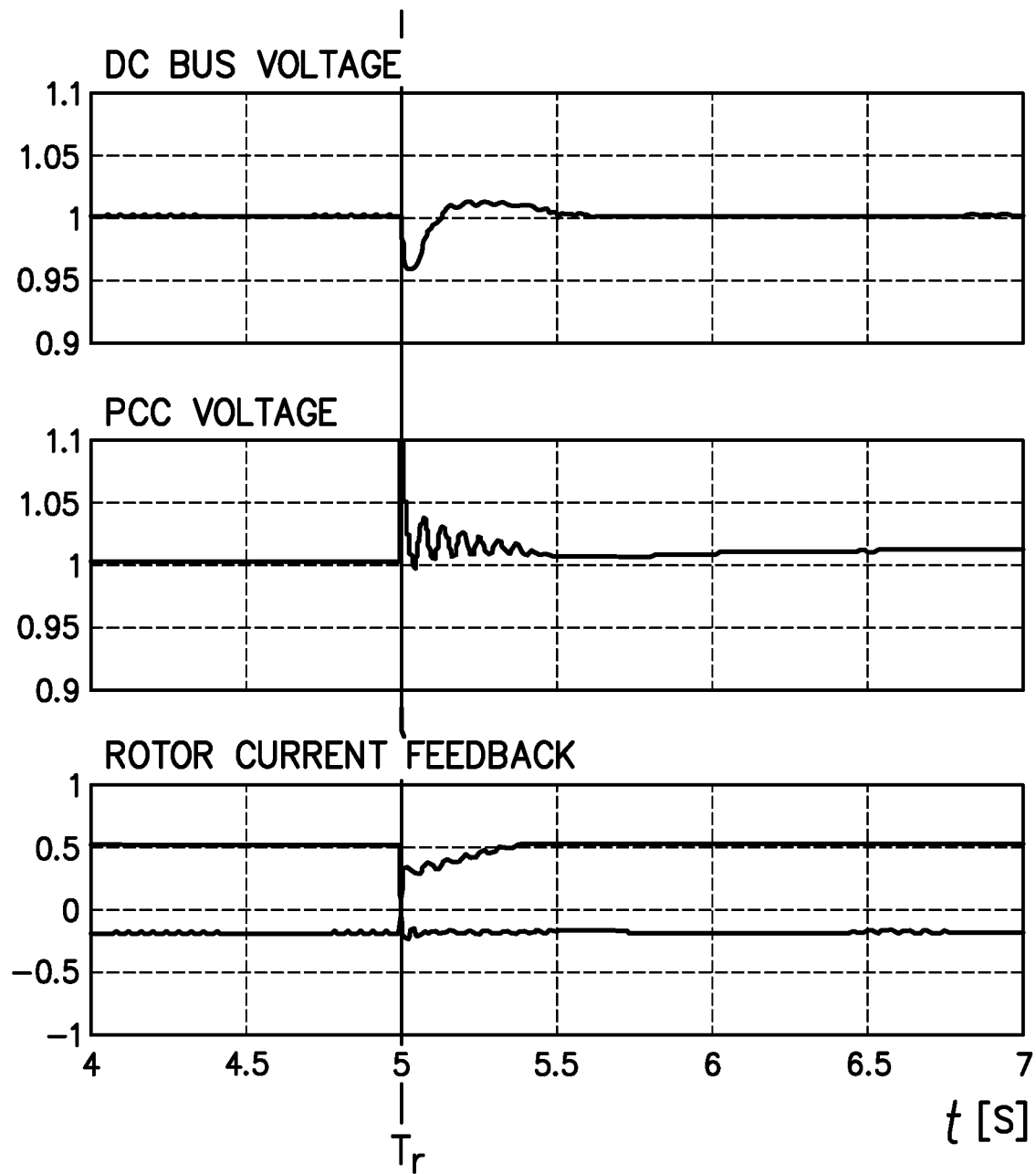
FIG. -11-

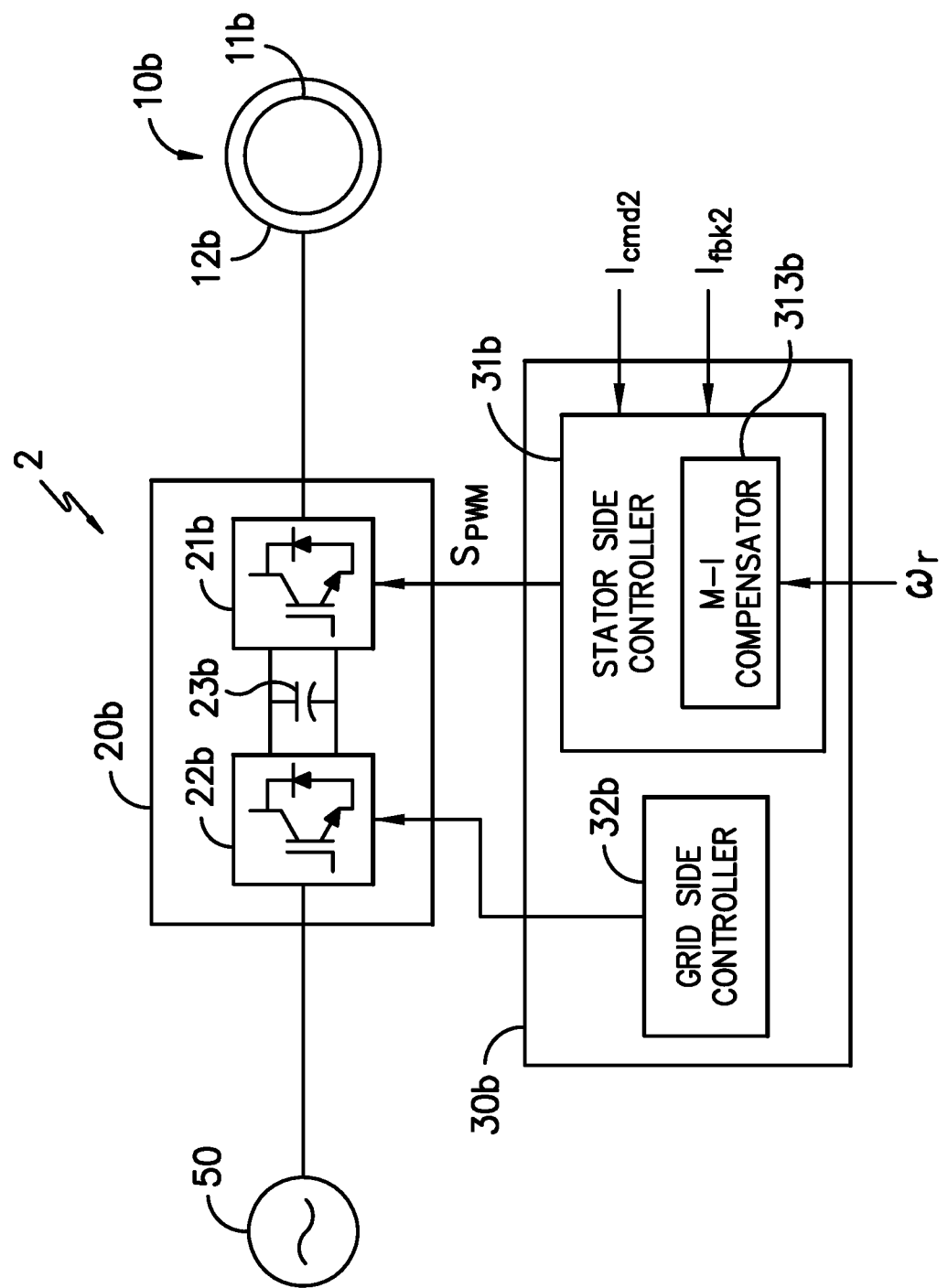
FIG. -12-

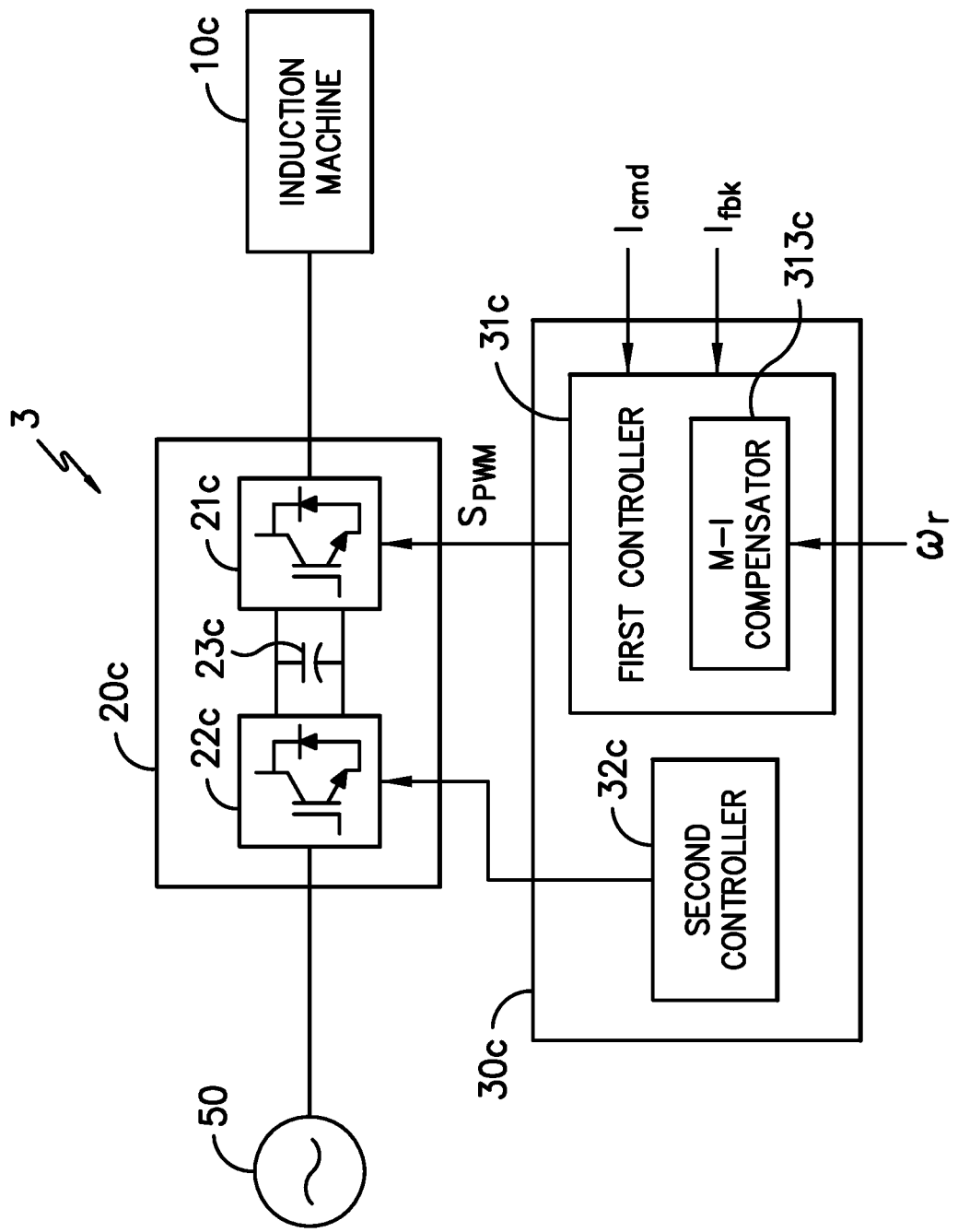
FIG. -13-

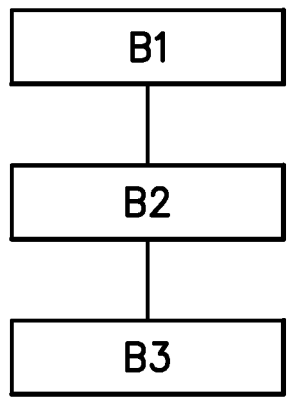
FIG. -14-
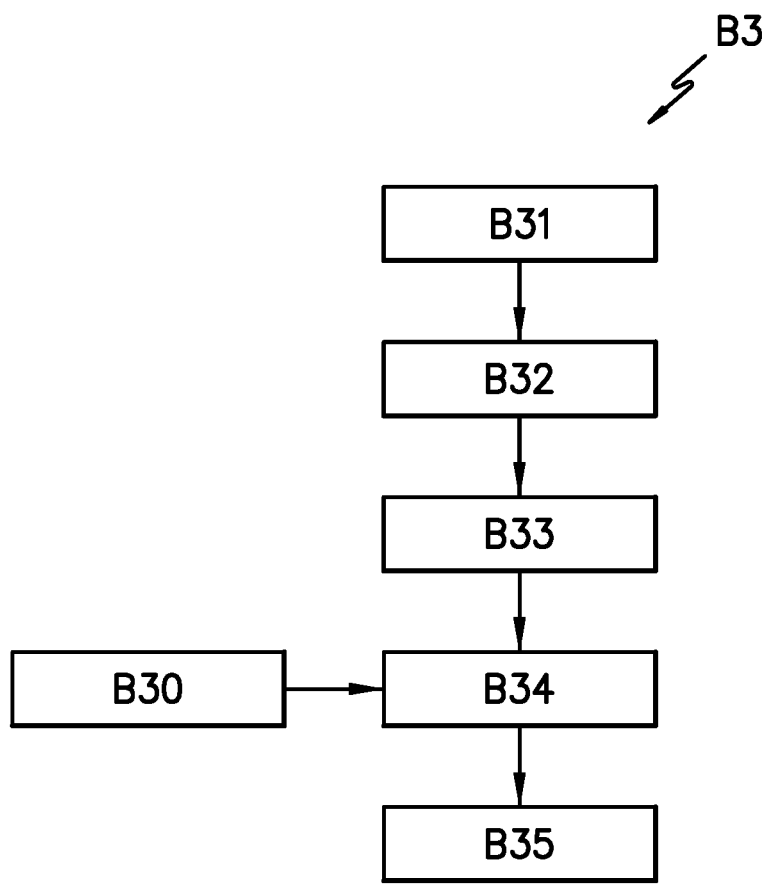
FIG. -15-

POWER GENERATION SYSTEM, SYSTEM FOR SUPPRESSING SUB-SYNCHRONOUS OSCILLATION AND METHOD FOR CONTROLLING OPERATION OF POWER SYSTEM

TECHNICAL FIELD

The present invention generally relates to the field of sub-synchronous oscillation damping, and in particular, to a power generation system, a system for suppressing sub-synchronous oscillations, and a method for controlling operation of a power system.

BACKGROUND

A power generation system typically includes a power converter for converting input power to power suitable for being applied to a load such as a generator, electric motor, power grid, or other suitable load. In many cases, the power generation system may be located in an area far away from the load it serves. Generally, such power generation systems are connected to the grid via a power system including a long transmission line. Such transmission lines usually include one or more series compensation components (for example, one or more capacitors), so as to facilitate reducing reactive losses in the transmission line, thereby increasing a power transfer capability of the transmission line. However, unfortunately, when the power generation system is connected to such a series-compensated transmission line, power-voltage oscillations occurred when a synchronous frequency is lower than that of the generator of the power generation system. This is called sub-synchronous oscillation (SSO), and there may be a sub-synchronization instability problem in the power generation system. Sub-synchronous oscillations may cause unexpected system errors, damage to generators and other equipment in the power generation system, and reduce the operational reliability of the power generation system. The sub-synchronous oscillations may cause more threats to the power generation system based on a double-fed induction generator (DFIG) due to the negative damping at a sub-synchronous frequency caused by a motion-induction effect of the DFIG. In this case, the power system cannot provide sufficient damping, thus causing instability problems in the power generation system.

In view of this, the need of preventing sub-synchronous oscillations is becoming increasingly urgent.

SUMMARY

An aspect of the present invention provides a power generation system. The power generation system includes a double-fed induction generator, a power converter, and a controller. The double-fed induction generator includes a rotor and a stator coupled to a grid. The power converter includes a rotor side converter coupled to the rotor of the generator, a grid side converter coupled to the grid, and a DC bus coupled between the rotor side converter and the grid side converter. The controller includes a rotor side controller for controlling the rotor side converter and a grid side controller for controlling the grid side converter. The rotor side controller includes a compensator having a transfer function and configured to counter a negative resistance effect of the generator to suppress sub-synchronous oscillations. The transfer function is expressed in a synchronous coordinate system as follows:

$$K(s+j\omega_0) = \frac{s+j(\omega_0-\omega_r)+\sigma_1}{s+j\omega_0+\sigma_2}$$

wherein K represents the transfer function, s represents a Laplace operator, j represents an imaginary unit, $\omega_0$ represents a synchronous frequency of the stator side of the generator, $\omega_r$ represents a rotational speed of the rotor, and $\sigma_1$ and $\sigma_2$ represent damping parameters used to enhance an internal stability of the power generation system, and $\sigma_1$ and $\sigma_2$ are determined based on one or more of an original control capability of the controller, a control object parameter of the power generation system, an external disturbance, and a dynamic response requirement of the power generation system.

Another aspect of the present invention provides a system for suppressing sub-synchronous oscillations. The system includes an induction machine, a power converter, and a controller. The power converter includes a first converter coupled to the induction machine and a second converter coupled to a grid. The controller includes a first controller for controlling the first converter and a second controller for controlling the second converter. The first controller includes a compensator having a transfer function and configured to counter a negative resistance effect of the induction machine to suppress sub-synchronous oscillations, where the transfer function is expressed in a synchronous coordinate system as follows:

$$K(s+j\omega_0) = \frac{s+j(\omega_0-\omega_r)+\sigma_1}{s+j\omega_0+\sigma_2}$$

wherein K represents the transfer function, s represents a Laplace operator, j represents an imaginary unit, $\omega_0$ represents a synchronous frequency of a stator side of the induction machine, $\omega_r$ represents a rotational speed of a rotor of the induction machine, and $\sigma_1$ and $\sigma_2$ represent damping parameters used to enhance an internal stability of the system, and $\sigma_1$ and $\sigma_2$ are determined based on one or more of an original control capability of the controller, a control object parameter of the system, an external disturbance, and a dynamic response requirement of the system.

Still another aspect of the present invention provides a method for controlling operation of a power system. The method includes: converting, by using a power converter of the power system, first alternating current power to direct current power, where the power converter includes a first converter coupled to an induction machine and a second converter coupled to a grid; converting, by using the power converter, the direct current power to second alternating current power; and controlling the first converter by a controller using a transfer function to counter a negative resistance effect of the induction machine to suppress sub-synchronous oscillations, where the transfer function is expressed in a synchronous coordinate system as follows:

$$K(s+j\omega_0) = \frac{s+j(\omega_0-\omega_r)+\sigma_1}{s+j\omega_0+\sigma_2}$$

wherein K represents the transfer function, s represents a Laplace operator, j represents an imaginary unit, $\omega_0$ represents a synchronous frequency of a stator side of the induction machine, $\omega_r$ represents a rotational speed of a rotor of the induction machine, and $\sigma_1$ and $\sigma_2$ represent damping parameters used to enhance an internal stability of the power system, and $\sigma_1$ and $\sigma_2$ are determined based on one or more of an original control capability of the controller, a control object parameter of the power system, an external disturbance, and a dynamic response requirement of the power system.

BRIEF DESCRIPTION OF DRAWINGS

These and other features, aspects and advantages of the present invention will become better understood when the following detailed description is read with reference to the accompanying drawings, in which like reference numerals are used throughout the drawings to refer to like parts, where:

FIG. 1 is a schematic diagram of a power generation system according to an embodiment of the present invention;

FIG. 2 is a schematic block diagram of a rotor side controller of the power generation system of FIG. 1;

FIGS. 3 to 7 show a compensator of FIG. 2 in different positions in the rotor side controller;

FIG. 8 is an illustration of equivalent conductance observed from a first direction and a second direction of FIG. 1 in a case in which the power generation system has no compensator;

FIG. 9 is an illustration of equivalent conductance observed from a first direction and a second direction of FIG. 1 in a case in which the power generation system has a compensator;

FIG. 10 is an illustration of a DC bus voltage of the power generation system, a voltage at a point of common connection, and rotor current feedback in a case in which the power generation system has no compensator;

FIG. 11 is an illustration of a DC bus voltage of the power generation system, a voltage at a point of common connection, and rotor current feedback in a case in which the power generation system has a compensator;

FIG. 12 is a schematic diagram of a power supply system according to another embodiment of the present invention;

FIG. 13 is a schematic diagram of a system for suppressing sub-synchronous oscillations according to still another embodiment of the present invention;

FIG. 14 is a flowchart of a method for controlling operation of a power system according to an embodiment of the present invention; and FIG. 15 shows detailed steps of how to control a first converter to counter a negative resistance effect of an induction machine in FIG. 14.

DETAILED DESCRIPTION OF EMBODIMENTS

The embodiments of the present invention will be described below in detail with reference to the accompanying drawings in order to facilitate those skilled in the art to exactly understand the subject matter claimed by the present invention. In the following detailed description of these specific embodiments, the present specification does not describe in detail any of the known functions or configurations, to avoid unnecessary details that may affect the disclosure of the present invention.

Unless otherwise defined, the technical and scientific terms used in the claims and the specification are as they are usually understood by those skilled in the art to which the present invention pertains. "First", "second" and similar words used in the specification and the claims do not denote any order, quantity or importance, but are merely intended to distinguish between different constituents. The terms "one", "a" and similar words are not meant to be limiting, but rather denote the presence of at least one. "Comprising", "consisting of" and similar words mean that the elements or articles appearing before "comprising" or "consisting of" include the elements or articles and their equivalent elements appearing behind "comprising" or "consisting of", not excluding any other elements or articles. "Connected", "coupled" and similar words are not restricted to physical or mechanical connections, but may also include electrical connections, whether direct or indirect. Further, terms indicating a specific position, such as "top", "bottom", "left", "right", and the like are merely descriptions made with reference to specific drawings. Each embodiment disclosed herein may be placed in different ways as illustrated in the drawings of the present invention. Therefore, the positional terms used herein should not be limited to the positions shown in the specific embodiments.

Power Generation System

FIG. 1 shows a schematic diagram of an exemplary power generation system 1 according to an embodiment of the present invention. As shown in FIG. 1, for the purpose of description, the power generation system 1 in this embodiment is shown as a wind power generation system 1 as an example. The wind power generation system 1 includes a double-fed induction generator (DFIG) 10, a power converter 20, a controller 30, and a transformer 40.

The DFIG 10 includes a rotor 11 and a stator 12. The stator 12 is coupled to a grid 50 via the transformer 40. The rotor 11 is coupled to a wind turbine 13 via a rotor shaft 14. The wind turbine 13 is configured to rotate in response to wind energy received by the wind turbine 13 to drive the DFIG 10 such that the DFIG 10 outputs alternating current (AC) power.

The power converter 20 includes a rotor side converter 21, a grid side converter 22, and a DC bus (DC link) 23 coupled between the rotor side converter 21 and the grid side converter 22. The rotor side converter 21 is electrically coupled to the rotor 11 of the DFIG 10 and is configured to convert AC power from the rotor 11 of the DFIG 10 to direct current (DC) power. The grid side converter 22 is electrically coupled to the grid 50 via the transformer 40 and is configured to convert the DC power to AC power at a frequency compatible with the grid 50.

The transformer 40 is configured to provide voltage or current conversion between power from the power converter 20 and power from the stator 12 of the DFIG 10 and provide isolation between the power converter 20 and the grid 50 and between the DFIG 10 and the grid 50. The transformer 40 is configured to increase the amplitude of the AC voltage output from the grid side converter 22 and the stator 12 of the DFIG 10 to match the grid 50.

In an optional embodiment, the stator 12 of the DFIG 10 and the grid side converter 22, especially the transformer 40, may be coupled to the grid 50 via a transmission line including a series compensation device 60 (that is, a series compensation transmission line). Alternatively, the series compensation device 60 may be connected in parallel with a switch 70. That is, the series compensation device 60 and the switch 70 are connected in parallel in a transmission line between the grid 50 and the transformer 40. Therefore, the power generation system 1 can be selectively connected to a transmission line including the series compensation device 60.

The controller 30 is configured to control the operation of the rotor side converter 21 and the grid side converter 22.

The controller 30 may include one or more suitable programmable circuits or devices, such as a digital signal processor (DSP), a field programmable gate array (FPGA), a programmable logic controller (PLC), and an application specific integrated circuit (ASIC). The controller 30 may be implemented in hardware, software, or a combination of hardware and software.

In the embodiment of FIG. 1, the controller 30 includes a rotor side controller 31 and a grid side controller 32. The rotor side controller 31 is configured to control the rotor side converter 21 and includes a motion-induction (M-I) compensator 313. The M-I compensator 313 can counter a negative resistance effect of the generator 10 to suppress sub-synchronous oscillations. The grid side controller 32 is configured to control the grid side converter 22.

FIG. 2 shows a schematic block diagram of the rotor side controller 31. Referring to FIG. 2, the rotor side controller 31 includes a current regulator 311 and a modulator 312. The M-I compensator 313 is introduced into the current regulator 311. The rotor side controller 31 may also include a subtracter 314. The subtracter 314 may receive a rotor current command $I_{cmd1}$ of the rotor 11 and rotor current feedback $I_{fbk1}$ of the rotor, and output a rotor current error $I_{error1}$ between the rotor current command $I_{cmd1}$ and the rotor current feedback $I_{fbk1}$, which is shown in the following formula:

$$I_{error1} = I_{cmd1} - I_{fbk1} \quad (1)$$

The current regulator 311 may generate a rotor voltage command $U_{cmd}$ of the rotor 11 based on the rotor current error $I_{error1}$. The M-I compensator 313 may compensate the rotor voltage command $U_{cmd}$ to generate a compensated rotor voltage command $U_{cmd1}$. The modulator 312 may receive the compensated rotor voltage command $U_{cmd1}$, and generate a pulse width modulated signal $S_{PWM}$ based on the compensated rotor voltage command $U_{cmd1}$ and send the pulse width modulated signal $S_{PWM}$ to the rotor side converter 21.

As shown in FIG. 3, in one embodiment, the current regulator 311 includes a proportional-integral (PI) regulator. The PI regulator has a proportional controller 3111 and an integral controller 3112. Both the proportional controller 3111 and the integral controller 3112 receive the rotor current error $I_{error1}$, and the outputs of the proportional controller 3111 and the integral controller 3112 are summed by an adder 315 to obtain the rotor voltage command $U_{cmd}$. Specifically, the rotor voltage command $U_{cmd}$ can be obtained as follows:

$$U_{cmd} = \left(K_p + \frac{K_i}{S}\right) \times I_{error1} \quad (2)$$

In formula (2), $K_p$ and $K_i$ are the proportion and the integral coefficient respectively.

In the embodiment of FIG. 3, the M-I compensator 313 is located downstream of the proportional controller 3111 and the integral controller 3112. The M-I compensator 313 may compensate the rotor voltage command $U_{cmd}$ to generate the compensated rotor voltage command $U_{cmd1}$. The M-I compensator 313 receives a rotational speed $\omega_r$ of the rotor 11 and has a transfer function related to the rotational speed $\omega_r$ of the rotor 11.

In one embodiment, the transfer function of the M-I compensator 313 is expressed in a synchronous coordinate system as follows:

$$K(s + j\omega_0) = 1 - \frac{j\omega_r}{s + j\omega_0} \quad (3)$$

In formula (3), K represents the transfer function, s represents a Laplace operator, j represents an imaginary unit, $\omega_0$ represents a synchronous frequency of the stator side of the DFIG 10 (because the stator of the DFIG 10 is electrically coupled to the grid 50, so that the synchronous frequency of the stator side of the DFIG 10 is the frequency of the grid 50), and $\omega_r$ represents the rotational speed of the rotor 11.

In another embodiment, to enhance the internal stability of the power generation system 1, the transfer function of the M-I compensator 313 can be further expressed in a synchronous coordinate system as follows:

$$K(s + j\omega_0) = \frac{s + j(\omega_0 - \omega_r) + \sigma_1}{s + j\omega_0 + \sigma_2} \quad (4)$$

In formula (4), $\sigma_1$ and $\sigma_2$ represent damping parameters used to enhance an internal stability of the power generation system 1. Values of $\sigma_1$ and $\sigma_2$ may be equal to 0. When the values of $\sigma_1$ and $\sigma_2$ in formula (4) are equal to 0, formula (3) can be obtained. The values of $\sigma_1$ and $\sigma_2$ can be determined based on one or more of an original control capability of the controller 30, a control object parameter of the power generation system 1, an external disturbance, and a dynamic response requirement of the power generation system 1. For example, when the original control capability of the controller 30 is strong, the value of $\sigma_1$ and/or $\sigma_2$ may be smaller, and when the original control capability of the controller 30 is weak, the value of $\sigma_1$ and/or $\sigma_2$ may be larger. When the external disturbance is small, the value of $\sigma_1$ and/or $\sigma_2$ may be smaller, and when the external disturbance is large, the value of $\sigma_1$ and/or $\sigma_2$ may be larger.

Continue to refer to FIG. 3, the rotor voltage command $U_{cmd}$ can be multiplied by the transfer function of the M-I compensator 313 to obtain the compensated rotor voltage command $_{cmd1}$.

Optionally, the current regulator 311 may further include a decoupling controller 3113. The decoupling controller 3113 can improve the current response performance of the power generation system 1. As an example, in the illustration of the present invention, the decoupling controller 3113 receives the rotor current feedback $I_{fbk1}$ and outputs a decoupled voltage $U_d$. However, the decoupling controller 3113 of the present invention is not limited to receiving only the rotor current feedback $I_{fbk1}$. In fact, the decoupling controller 3113 of the present invention can receive any one of the rotor current feedback $I_{fbk1}$, the rotor current command $I_{cmd1}$, and the rotor current error $I_{error1}$. In the embodiment having the decoupling controller 3113 shown in FIG. 3, the output of the M-I compensator 313 and the decoupled voltage $U_d$ are further summed by an adder 316 to obtain the compensated rotor voltage command $U_{cmd1}$. In this case, the compensated rotor voltage command $U_{cmd1}$ includes the decoupled voltage $U_d$.

Moreover, the M-I compensator 313 may also be disposed at other different positions of the current regulator 311. As shown in FIG. 4, the M-I compensator 313 is located upstream of the proportional controller 3111 and the integral controller 3112. In the embodiment of FIG. 4, the compensated rotor voltage command $U_{cmd1}$ includes the decoupled voltage $U_d$. As shown in FIG. 5, the M-I compensator 313 may be located downstream of the proportional controller 3111. In the embodiment of FIG. 5, the compensated rotor voltage command $U_{cmd1}$ includes the decoupled voltage $U_d$. As shown in FIG. 6, the M-I compensator 313 may be located upstream of the proportional controller 3111. In the embodiment of FIG. 6, the compensated rotor voltage command $U_{cmd1}$ includes the decoupled voltage $U_d$. As shown in FIG. 7, the M-I compensator 313 may be located downstream of the proportional controller 3111, the integral controller 3112, and the decoupling controller 3113. In the embodiment of FIG. 7, the output of the adder 315 and the decoupled voltage $U_d$ are further summed by the adder 316 to obtain the rotor voltage command $U_{cmd}$. In this case, the rotor voltage command $U_{cmd}$ includes the decoupled voltage $U_d$.

In the power generation system 1 of the present invention, the M-I compensator 313 can be always enabled. Alternatively, the M-I compensator 313 can be selectively enabled. For example, in one embodiment, when the power generation system 1 is connected to the grid 50 via a transmission line including the series compensation device 60, the M-I compensator 313 is enabled. In another embodiment, when a frequency f of an AC component in the generator 10 is lower than the rotational speed $\omega_r$ of the rotor 11, the M-I compensator 313 is enabled. In still another embodiment, when the power generation system 1 has the series compensation device 60 and the frequency f of the AC component in the generator 10 is lower than the rotational speed $\omega_r$ of the rotor 11, the M-I compensator 313 is enabled.

FIG. 8 shows an illustration of equivalent conductance observed from a first direction $D_1$ and a second direction $D_2$ of FIG. 1 in a case in which the power generation system does not have the M-I compensator 313, and FIG. 9 shows an illustration of equivalent conductance observed from the first direction $D_1$ and the second direction $D_2$ of FIG. 1 in a case in which the power generation system has the M-I compensator 313. For clarity of illustration, in FIGS. 8 and 9, the horizontal axis represents the frequency f of the AC component of the generator 10 of the power generation system 1, and the vertical axis represents the real part of the admittance, that is, conductance G. In addition, the equivalent conductance observed from the first direction $D_1$ of FIG. 1 represents equivalent conductance observed from the stator side direction of the DFIG 10, and the equivalent conductance observed from the second direction $D_2$ of FIG. 1 represents total conductance of the wind power generation system. As shown in FIG. 8, when the power generation system does not have the M-I compensator 313, the equivalent conductance observed from the first direction $D_1$ and the second direction $D_2$ of FIG. 1 is a negative value. However, as shown in FIG. 9, when the M-I compensator 313 is introduced into the power generation system 1, the negative conductance observed from the first direction $D_1$ and the second direction $D_2$ of FIG. 1 can be removed by the M-I compensator 313, especially in a case of low frequencies.

FIG. 10 shows an illustration of a DC bus voltage of the power generation system, a voltage at a point of common connection (PCC) P, and rotor current feedback in a case in which the power generation system does not have the M-I compensator 313. Referring to FIG. 10, at time $T_0$, the series compensation device 60 is inserted into a transmission line for connecting the power generation system having no M-I compensator 313 and the grid. It can be seen from FIG. 10, after the series compensation device 60 is inserted into the transmission line, the DC bus voltage of the power generation system, the voltage at the point of common connection P, and the rotor current feedback are oscillated due to the M-I effect of the DFIG 10. Therefore, in order to suppress sub-synchronous oscillations of the power generation system, the M-I compensator 313 of the present invention can be introduced into the power generation system 1. FIG. 11 shows an illustration of a DC bus voltage of the power generation system 1, a voltage at a point of common connection P, and rotor current feedback in a case in which the power generation system 1 has the M-I compensator 313. It can be seen from FIG. 11, the M-I compensator 313 can make the power generation system 1 more stable after the series compensation device 60 is inserted into the transmission line.

The M-I compensator 313 is introduced into the current regulator, so that the power generation system 1 of the present invention can directly counter the M-I effect of the DFIG 10, and therefore, it is possible to effectively suppress the sub-synchronous oscillation and ensure the stability of the system.

Power Supply System

FIG. 12 shows a schematic diagram of an exemplary power supply system 2 according to another embodiment of the present invention. Different from the power generation system 1 of FIG. 1, the power supply system 2 of FIG. 12 includes an electric motor 10b, such as a squirrel cage motor. The power supply system 2 of FIG. 12 also includes a power converter 20b and a controller 30b.

In the power supply system 2 of FIG. 12, the power converter 20b is coupled between a stator 12b of the electric motor 10b and the grid 50, and includes a stator side converter 21b, a grid side converter 22b, and a DC bus 23b coupled between the stator side converter 21b and the grid side converter 22b. The stator side converter 21b is electrically coupled to the stator 12b of the electric motor 10b. The controller 30b includes a stator side controller 31b for controlling the stator side converter 21b and a grid side controller 32b for controlling the grid side converter 22b. The stator side controller 31b receives a stator current command $I_{cmd2}$ of the stator 12b and stator current feedback $I_{fbk2}$ of the stator 12b, and generates a stator voltage command of the stator 12b based on a stator current error between the stator current command $I_{cmd2}$ and the stator current feedback $I_{fbk2}$. To compensate the negative resistance effect of the electric motor 10b, the M-I compensator 313b is introduced into the stator side controller 31b. The M-I compensator 313b can compensate the stator voltage command to generate a compensated stator voltage command so as to suppress sub-synchronous oscillations. The stator side controller 31b may generate a pulse width modulated signal $S_{PWM}$ based on the compensated stator voltage command and provide the pulse width modulated signal $S_{PWM}$ to the stator side converter 21b. The M-I compensator 313b of the power supply system 2 of FIG. 12 has a transfer function and position settings similar to the M-I compensator 313 of the power generation system 1 of FIG. 1.

It can be understood that since the power supply system 2 of FIG. 12 uses the electric motor 10b to replace the generator 10 of the power generation system 1 of FIG. 1, in the transfer function of the M-I compensator 313b of the power supply system 2, $\omega_0$ and $\omega_r$ respectively represent a synchronous frequency on the stator side of the electric motor 10b and the rotational speed of the rotor 11b of the electric motor 10b.

System for Suppressing Sub-Synchronous Oscillations

The M-I compensator of the present invention can be applied to a power generation system with a generator and a power supply system with an electric motor. Moreover, in fact, the M-I compensator of the present invention can be applied to any system having an induction machine and configured to suppress sub-synchronous oscillations. For example, FIG. 13 shows a schematic diagram of an exemplary system 3 for suppressing sub-synchronous oscillations according to still another embodiment of the present invention. The system 3 of FIG. 13 includes an induction machine 10c, a power converter 20c, and a controller 30c.

In the system 3 of FIG. 13, the power converter 20c is coupled between the induction machine 10c and the grid 50, and includes a first converter 21c coupled to the induction machine 10c, a second converter 22c coupled to the grid 50, and a DC bus 23c coupled between the first converter 21c and the second converter 22c. The controller 30c includes a first controller 31c for controlling the first converter 21c and a second controller 32c for controlling the second converter 22c. The first controller 31c includes an M-I compensator 313c for counteracting a negative resistance effect of the induction machine 10c to suppress sub-synchronous oscillations.

The first controller 31c includes a current regulator and a modulator. The first controller 31c receives a current command $I_{cmd}$ of the induction machine 10c and current feedback $I_{fbk}$ of the induction machine 10c. The current regulator may generate a voltage command of the induction machine 10c based on a current error between the current command $I_{cmd}$ of the induction machine 10c and the current feedback $I_{fbk}$ of the induction machine 10c. The M-I compensator 313c is introduced to the current regulator and configured to compensate the voltage command of the induction machine 10c to generate a compensated voltage command. The modulator may generate a pulse width modulated signal $S_{PWM}$ based on the compensated rotor voltage command and send the pulse width modulated signal $S_{PWM}$ to the first converter 21c. The M-I compensator 313c of the system 3 of FIG. 13 has a transfer function and position settings similar to the M-I compensator 313 of the power generation system 1 of FIG. 1.

It can be understood that since the system 3 of FIG. 13 uses the induction machine 10c to replace the generator 10 of the power generation system 1 of FIG. 1, in the transfer function of the M-I compensator 313c of the system 3, $\omega_0$ and $\omega_r$ respectively represent a synchronous frequency on the stator side of the induction machine 10c and the rotational speed of the rotor of the induction machine 10c.

Method for Controlling Operation of a Power System

FIG. 14 shows a flowchart of an exemplary method for controlling operation of a power system according to an embodiment of the present invention. The method may include the following steps.

As shown in FIG. 14, in step B1, first alternating current (AC) power is converted to direct current (DC) power by a power converter of the power system. The power converter includes a first converter coupled to an induction machine and a second converter coupled to a grid. When the power system is a power generation system and the induction machine is a generator, the first AC power is converted to DC power by the first converter. When the power system is a power supply system and the induction machine is an electric motor, the first AC power is converted to DC power by the second converter.

In step B2, the direct current (DC) power is converted to second alternating current (AC) power by the power converter. When the power system is a power generation system and the induction machine is a generator, the DC power is converted to the second AC power by the second converter. When the power system is a power supply system and the induction machine is an electric motor, the DC power is converted to the second AC power by the first converter.

In step B3, the first converter is controlled by a controller using a transfer function similar to the above to counter the negative resistance effect of the induction machine to suppress sub-synchronous oscillations.

How the first converter is controlled by the controller in step B3 of FIG. 14 will be described in detail below with reference to FIG. 15.

In step B30 of FIG. 15, a transfer function associated with the rotational speed of the rotor of the induction machine is predetermined. The transfer function can be shown as the above formula (3) or (4).

In step B31, a current command of the induction machine, current feedback of the induction machine, and a rotational speed of the rotor are received.

In step B32, a current error between the current command and the current feedback is obtained.

In step B33, a voltage command of the induction machine is generated based on the current error.

In step B34, the voltage command is compensated using the transfer function predetermined in step B30 and the rotational speed of the rotor received in step B31, so as to generate a compensated voltage command. As an example, when the frequency of an AC component in the induction machine is lower than the rotational speed of the rotor, the transfer function is used to compensate the voltage command.

In an optional embodiment, the method of the present invention may include outputting a decoupled voltage based on one of the current feedback, current command, and current error. In this case, the voltage command or the compensated voltage command may include the decoupled voltage.

In step B35, a pulse width modulated signal is generated based on the compensated voltage command, and the pulse width modulated signal is provided to the first converter. Therefore, the negative resistance effect of the induction machine can be countered to suppress sub-synchronous oscillations of the power system.

Although the steps of the method for controlling operation of the power system according to the embodiment of the present invention are shown as functional blocks, the order of respective functional blocks shown in FIGS. 14 and 15 and the actions for separation between the respective functional blocks are not intended to be limiting. For example, various functional blocks may be executed in a different order, and the actions associated with a functional block may be combined with one or more other functional blocks or may be subdivided into multiple functional blocks.

While the present invention has been described in detail with reference to specific embodiments thereof, it will be understood by those skilled in the art that many modifications and variations can be made in the present invention. It is, therefore, to be understood that the appended claims are intended to cover all such modifications and variations insofar as they are within the true spirit and scope of the invention.

What is claimed is:
1. A power generation system, comprising:
 a doubly-fed induction generator comprising a stator coupled to an electrical grid and a rotor;
 a power converter comprising:
  a rotor side converter coupled to the rotor of the generator;
  a grid side converter coupled to the electrical grid; and a DC link coupled between the rotor side converter and the grid side converter; and a controller comprising:

a rotor side controller for controlling the rotor side converter, the rotor side controller comprising a compensator software module to be used in controlling the rotor side converter, the compensator software module programmed with a transfer function for compensating for a negative resistance effect of the generator in order to damp a sub-synchronous oscillation, wherein the sub-synchronous oscillation is a power-voltage oscillation occurring when a synchronous frequency of the electrical grid is lower than a frequency of the generator, wherein the transfer function is associated with a rotational speed of the rotor and is expressed as follows under a synchronous frame:

$$K(s + j\omega_0) = 1 - \frac{j\omega_r}{s + j\omega_0}$$

wherein s represents a Laplace operator, $\omega_0$ represents a synchronous frequency of the electrical grid, and $\omega_r$ represents the rotational speed of the rotor; and a grid side controller for controlling the grid side converter.

2. The power generation system of claim 1, wherein the rotor side controller further comprises:

a current regulator software module for generating a rotor voltage command of the rotor based on a rotor current error between a rotor current command of the rotor and a rotor current feedback of the rotor; wherein the rotor side controller is configured to modify the rotor voltage command by multiplying the rotor voltage command by the transfer function so as to generate a compensated rotor voltage command via the transfer function, and a modulator software module for generating a pulse width modulation signal based on the compensated rotor voltage command, wherein to the rotor side converter is configured to receive the compensated rotor voltage command.

3. The power generation system of claim 2, wherein the compensator software module is enabled to counter the sub-synchronous oscillation produced when a frequency of an AC component of the generator is lower than the rotational speed of the rotor.

4. The power generation system of claim 2, wherein the current regulator software module comprises a proportional-integral regulator software module having a proportional controller software module and an integral controller software module.

5. The power generation system of claim 4, wherein the compensator software module is located upstream or downstream of the proportional controller software module.

6. The power generation system of claim 4, wherein the compensator software module is located upstream or downstream of both the proportional controller software module and the integral controller software module.

7. The power generation system of claim 1, wherein the stator of the generator and the grid side converter are coupled to the electrical grid via a series compensated transmission line.

8. The power generation system of claim 1, wherein the power generation system comprises a wind turbine system.

9. A system for damping sub-synchronous oscillation, comprising:

an induction machine;

a power converter comprising:

a first converter coupled to the induction machine; and a second converter coupled to an electrical grid; and a controller comprising:

a first controller for controlling the first converter, the first controller comprising a compensator software module to be used in controlling the first converter, the compensator software module programmed with a transfer function for compensating for a negative resistance effect of the induction machine in order to damp a sub-synchronous oscillation, wherein the sub-synchronous oscillation is a power-voltage oscillation occurring when a synchronous frequency of the electrical grid is lower than a frequency of the induction machine, wherein the transfer function is associated with a rotational speed of a rotor of the induction machine and is expressed as follows under a synchronous frame:

$$K(s + j\omega_0) = 1 - \frac{j\omega_r}{s + j\omega_0}$$

wherein s represents a Laplace operator, $\omega_0$ represents a synchronous frequency of the electrical grid, and $\omega_r$ represents the rotational speed of the rotor; and a second controller for controlling the second converter.

10. The system of claim 9, wherein the first controller further comprises:

a current regulator software module for generating a voltage command of the induction machine based on a current error between a current command of the induction machine and a current feedback of the induction machine; wherein the first controller is configured to modify the voltage command by multiplying the voltage command by the transfer function so as to generate a compensated voltage command via the transfer function, and a modulator software module for generating a pulse width modulation signal based on the compensated voltage command, wherein the first converter is configured to receive the compensated rotor voltage command.

11. The system of claim 9, wherein the first converter is coupled to the rotor or a stator of the induction machine.

12. The system of claim 9, wherein the system is a power generation system, and the induction machine is a generator.

13. The system of claim 9, wherein the system is a power supply system, and the induction machine is a motor.

14. A power generation system, comprising:

a doubly-fed induction generator comprising a stator coupled to an electrical grid and a rotor;

a power converter comprising:

a rotor side converter coupled to the rotor of the generator;

a grid side converter coupled to the electrical grid; and a DC link coupled between the rotor side converter and the grid side converter; and a controller comprising:

a rotor side controller for controlling the rotor side converter, the rotor side controller comprising a compensator software module to be used in controlling the rotor side converter, the compensator software module programmed with a transfer function for compensating for a negative resistance effect of the generator in order to damp a sub-synchronous oscillation, wherein the sub-synchronous oscillation is a power-voltage oscillation occurring when a synchronous frequency of the electrical grid is lower than a frequency of the generator, wherein the transfer function is associated with a rotational speed of the rotor and is expressed as follows under a synchronous frame:

$$K(s + j\omega_0) = \frac{s + j(\omega_0 - \omega_r) + \sigma_1}{s + j\omega_0 + \sigma_2}$$

wherein s represents a Laplace operator, $\omega_0$ represents a synchronous frequency of the electrical grid, $\omega_r$ represents the rotational speed of the rotor, and $\sigma_1$ and $\sigma_2$ represent damping parameters to enhance internal stability of the power generation system, wherein at least one of $\sigma_1$ or $\sigma_2$ has a value greater than zero; and a grid side controller for controlling the grid side converter.

15. The power generation system of claim 14, wherein the rotor side controller comprises:

a current regulator software module for generating a rotor voltage command of the rotor based on a rotor current error between a rotor current command of the rotor and a rotor current feedback of the rotor; wherein the rotor side controller is configured to modify the rotor voltage command by multiplying the rotor voltage command by the transfer function so as to generate a compensated rotor voltage command via the transfer function, and a modulator software module for generating a pulse width modulation signal based on the compensated rotor voltage command, wherein the rotor side converter is configured to receive the compensated rotor voltage command.

16. The power generation system of claim 15, wherein the compensator software module is enabled to counter the sub-synchronous oscillation produced when a frequency of an AC component of the generator is lower than the rotational speed of the rotor.

17. The power generation system of claim 15, wherein the current regulator software module comprises a proportional-integral regulator software module having a proportional controller software module and an integral controller software module.

* * * * *